Feb. 11, 1930. A. V. BILLS 1,746,631
VEHICLE DIRECTION, WARNING, AND STOP SIGNALING APPARATUS
Filed June 5, 1924
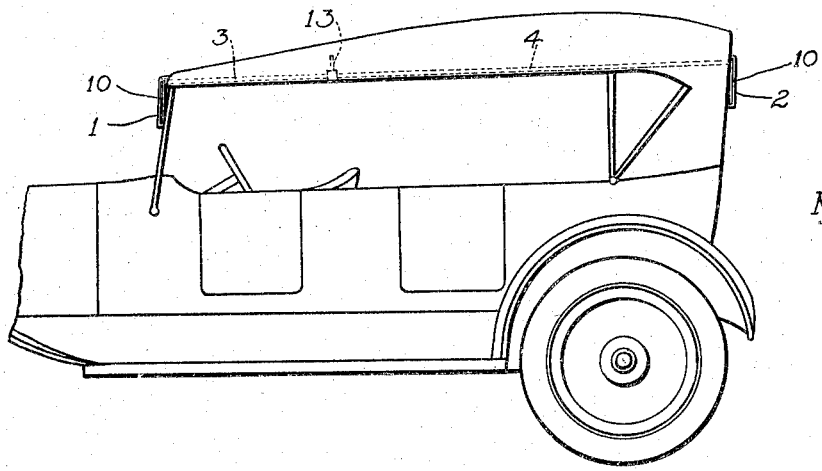
FIG 1
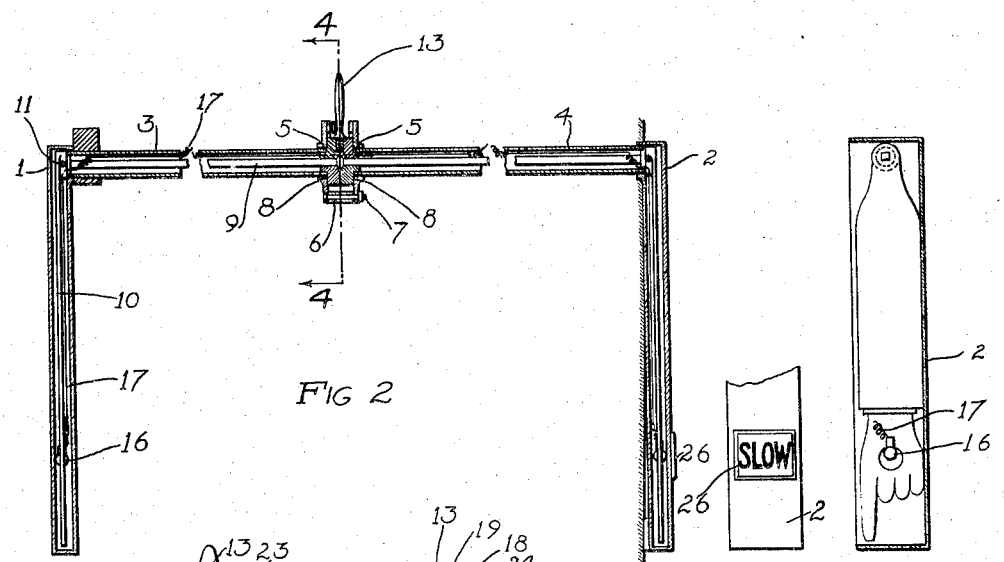
Inventor
ALBERT V. BILLS
By A. B. Bowman
Attorney Patented Feb. 11, 1930

1,746,631

UNITED STATES PATENT OFFICE

ALBERT V. BILLS, OF SAN DIEGO, CALIFORNIA

VEHICLE DIRECTION, WARNING, AND STOP SIGNALING APPARATUS

Application filed June 5, 1924. Serial No. 718,022.

My invention relates to vehicle direction, warning and stop signaling apparatus, and the objects of my invention are: First, to provide an apparatus of this class whereby direction and stop signals may be simultaneously indicated at the upper portion of the front and rear of the vehicle; second, to provide a semaphore signaling and stop apparatus for vehicles whereby signal members at the front and rear of the vehicle may be readily shifted from the operator's seat and resiliently held in certain shifted positions; third, to provide a vehicle signaling apparatus which consists of a tubular means provided with a readily separable casing in which is rotatably mounted a separable signal member shifting means provided with outwardly extending shifting rods; fourth, to provide a resilient means in connection with the signal member shifting means which is adapted to engage spaced apart notched portions in the periphery of the shifting member for resiliently holding the same in certain shifted positions; and fifth, to provide such an apparatus which is simple and economical of construction, durable, easy to install, applicable to vehicles of all makes, styles and shapes, and such an apparatus which will not readily deteriorate or get out of order.

With these and other objects in view, as will appear hereinafter, my invention consists of certain novel features of construction, combination and arrangement of parts and portions, as will be hereinafter described in detail and particularly set forth in the appended claim, reference being had to the accompanying drawings and to the characters of reference thereon, which form a part of this application, in which:

Figure 1 is a fragmentary side elevational view of a conventional touring automobile with my signaling apparatus in connection therewith; Fig. 2 is an enlarged fragmentary side elevational view of my signaling apparatus, showing certain parts and portions thereof broken away and in section to facilitate the illustration; Fig. 3 is an end elevational view thereof, showing particularly one of the signal arms with the enclosing casing broken away and in section to facilitate the illustration; Fig. 4 is an enlarged transverse sectional view of the signal arm shifting means, with the section taken through 4—4 of Fig. 2, showing certain parts and portions thereof in elevation; Fig. 5 is a developed side view of a portion of the shifting means with the developed view taken at 5—5 of Fig. 4, and Fig. 6 is a fragmentary end elevational view of the rear signal arm casing, showing the "Slow" warning signal means in connection therewith.

Like characters of reference refer to similar parts and portions throughout the several views of the drawings.

The signal arm casings 1 and 2, tubes 3 and 4, casing members 5 and 6, bolts 7, signal arm shifting members 8, rods 9, signal arms 10, screws 11 and 12, signal arm shifting handle 13, spring 14, screws 15, bulbs 16, electrical conductors 17, contact member 18, insulating member 19, contact member 20, electrical conductor 21, insulating members 22, screws 23, contact member 24, conductor 25, and the "Slow" warning member 26, constitute the principal parts and portions of my vehicle direction, warning and stop signaling apparatus.

In the preferred form of construction of my signaling apparatus, as illustrated in the drawings, I have provided a pair of signal arm casings 1 and 2, which are positioned at the front and rear of the vehicle, preferably in front of the windshield and behind the back portion of the top, respectively, and preferably secured to the top in any convenient manner. It will be noted that the casings may be positioned behind the windshield and in front of the back portion of the top side enclosure if desired, particularly if used in connection with enclosed vehicles, such as a sedan or coupé. The casings 1 and 2 are of flat construction and provided with openings at their outer sides or edges. To the upper portions of said casings are connected the one end of tubes 3 and 4, respectively, which tubes extend inwardly toward the operator's compartment of the vehicle. To the inner ends of said tubes 3 and 4 are screwably secured the casing members 5 in the form of flanges, which are spaced apart and secured relatively to each other by means of an annularly shaped casing member 6, the members 5 and 6 being secured together by means of a plurality of bolts 7, as shown best in Figs. 2 and 4 of the drawings. Within the casing formed by the members 5 and 6 are rotatably mounted a pair of signal arm shifting members 8, which are secured together by means of screws 12. Said members 8 are in the form of discs and are provided with outwardly extending bosses which extend into the inner ends of the tubes 3 and 4 for positioning the members 8 laterally within the casing. At the middle portions of the members 8 are secured the one end of the square or otherwise polygonally shaped rods 9, which extend through the tubes and into the upper portions of the casings 1 and 2. The rods 9 are preferably secured to the members 8 by riveting over the inner ends of said rods, as shown in Figs. 2 and 4. To the outer ends of the rods are secured the upper ends of the signal arms 10, preferably removably, by means of screws 11. The signal arms 10 are of flat and light construction, being preferably made from aluminum.

It will be here noted that the rods 9 are preferably made polygonal in cross-section so that the same may be cut off to any length desired to suit any type or make of vehicle and secured to the members 8 by riveting over the inner ends at the counter-sunk portions of the members 8.

The members 8 are provided with a plurality of longitudinal slots $8^a$ at their peripheries, said slots being preferably four in number corresponding with the four positions which the signal arms are adapted to assume. Within the circular opening of the middle annularly shaped casing member 6 is secured a leaf spring 14 by means of screws 15. The free end of the spring 14 is provided with an inwardly offset portion $14^a$, which is adapted to extend into the notches $8^a$ at the peripheries of the members 8 to hold said members in certain shifted positions.

Near the outer ends of the signal arms 10, which are in the form of hands, are provided electric bulbs 16, which are connected by means of conductors 17 with a contact member 18 secured to the one side of the handle 13 and insulated therefrom by means of an insulating member 19. It will be noted that the handle 13 is secured at its inner end in a threaded recess between the members 8 and extends outwardly through a circumferential slot $6^a$ in the member 6. The conductors 17 preferably extend through holes $8^b$ in the members 8 and outwardly to the peripheries thereof through slots $8^c$, as shown best in Figs. 4 and 5 of the drawings. To the wall of the circumferential slot $6^a$ of the member 6, at one side thereof, is secured a flexible contact member 20 by means of screws 23 and insulated therefrom by means of insulating members 22. It will be noted that the contact member is permanently secured to the member 6 at its one end and is permitted to move or yield freely when engaged by the contact member 18 but prevented from engaging the wall of the member 6 by means of the insulating member 22 positioned between the free end of the contact member 20 and the wall of the member 6, as shown best in Fig. 5. The yieldable contact member 20 is connected by means of a conductor 21 with a convenient source of electrical energy on the vehicle. It will be noted that the contact members 20 are engaged by the contact members 18 only when the signal members are shifted out of the casings 1 and 2.

The signal arm casing 2 at the rear of the vehicle is provided at the lower portion of its rear wall, opposite the bulb in the rear signal arm, with a translucent warning member 26, preferably of ruby colored glass, having the word "Slow" inscribed therein in any suitable manner. Within the slot $6^a$ of the member 6 and secured to the side wall thereof, to which the contact member 20 is secured, is another contact member 24 which is connected, by means of a conductor 25, to a switch means operable by the brake lever of the vehicle. The contact member 24 is at all times in engagement with the contact member 18 when the signal arms are positioned within the casings 1 and 2. However, the bulbs on the signal arms are not illuminated when the signal arms are in an inwardly shifted position until a contact is made by the switch means in connection with the brake lever when the latter is actuated. Thus the bulb in the rear signal arm serves two purposes when in different positions, that of giving a "Slow" warning signal and also for illuminating the signal arm when shifted outwardly.

It will be here noted that when desiring to install my signaling apparatus on an automobile having a right-hand drive, a lever similar to the lever 13 may be pivotally mounted on the right-hand side of the vehicle underneath and contiguous to the side of the top thereof and pivotally connected with the handle 13 by means of levers, links or bell-crank means, as desired or found necessary.

It is obvious from this construction, as illustrated in the drawings and disclosed in the foregoing specification, that there is provided a vehicle direction and stop signaling apparatus as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent, is:

In a vehicle signaling apparatus, a pair of signal arms mounted respectively at the front and rear portions of a vehicle at the top portion thereof, a pair of rods of polygonal cross-section removably connected at their one end with the upper ends of said signal arms, and a pair of separable disc-shaped signal arm shifting members provided with holes through their middle portions corresponding with the cross-section of said rods and slightly enlarged at their inner ends, said rods being adapted to be cut to size when installing and secured to the shifting members by riveting over the inner ends.

In testimony whereof, I have hereunto set my hand at San Diego, California, this 28th day of May, 1924.

ALBERT V. BILLS.